Patented Dec. 18, 1951

2,579,008

UNITED STATES PATENT OFFICE 2,579,008

INTERPOLYMERS OF UNSATURATED NITRILES

Marguerite Naps, Oakland, and Fred E. Condo, El Cerrito, Calif., assignors to Shell Development Company, San Francisco, Calif., a corporation of Delaware No Drawing. Application May 24, 1948, Serial No. 28,974

11 Claims. (Cl. 260—80.5)

This invention relates to a new class of interpolymers. More particularly the invention relates to a novel group of interpolymers produced from the alpha-hydrocarbon substituted, alpha-beta-unsaturated nitriles.

More specifically the invention provides a new and particularly useful class of interpolymers which are prepared by interpolymerizing alpha-substituted, alpha,beta-unsaturated nitriles with certain quantities of a non-alpha-substituted unsaturated nitrile and certain quantities of an unsaturated ester of an organic acid. The resins obtained from the novel interpolymers of the invention are characterized by the fact that they possess an improved heat resistance and high degree of hardness which are characteristic properties of the thermosetting resins and at the same time possess a degree of flexibility which is superior to many of the known thermoplastic resins.

Resins obtained from polymers of the alpha-hydrocarbon substituted, alpha,beta-unsaturated nitriles, such as methacrylonitrile have many desired properties such as are common to the thermoplastic resins, but they possess the unfavorable characteristic of becoming soft and losing their shape when subjected to a relatively high temperature, i. e. they have a relatively low heat-distortion point. Attempts have been made in the past to raise the heat resistance of these resins by the addition of other ingredients, etc., but it has been discovered that while the heat resistance of some of the resulting resins has been raised slightly there has been an accompanying decrease in the flexibility, solubility, etc. The production of resins from the alpha-hydrocarbon substituted, alpha,beta-unsaturated nitriles which possess both a relatively high heat resistance and at the same time retain or increase the characteristic properties of the thermoplastic resins, such as flexibility, would therefore, be a considerable advance to the art.

It is an object of the invention, therefore, to provide a new class of interpolymers of the alpha-hydrocarbon substituted, alpha,beta-unsaturated nitriles. It is a further object of the invention to provide resins from the alpha-hydrocarbon substituted, alpha,beta-unsaturated nitriles which possess an increased heat resistance and toughness and at the same time possess excellent flexibility and solubility. It is a further object to provide a novel class of interpolymers of the alpha-hydrocarbon substituted, alpha,-beta-unsaturated nitriles which may be produced in a very economical and practical manner and may be utilized for a great many industrial purposes for which many of the prior art polymers are entirely unsuited. It is a further object to provide novel interpolymers of methacrylonitrile which possess an increased heat resistance and an increased flexibility. Other objects of the invention will be apparent from the detailed description given hereinafter.

It has now been discovered that these and other objects of the invention may be readily attained by interpolymerizing the alpha-hydrocarbon substituted, alpha,beta-unsaturated nitriles with certain quantities of a non-alpha-substituted unsaturated nitrile and certain quantities of an unsaturated ester of an organic acid. The resins obtained from the interpolymers produced by this method possess an increased heat resistance and toughness yet at the same time possess an increased flexibility and solubility. Indeed, it was discovered that the resins not only possessed an increase in flexibility but possessed a flexural strength superior to any known commercial thermoplastic resins.

The production of resins having the above-described combination of properties from these particular components was highly unexpected in view of the fact that the polymers obtained from the copolymerization of the alpha-hydrocarbon substituted unsaturated nitriles individually with the non-alpha-substituted unsaturated nitriles, such as acrylonitrile, and with the unsaturated esters of the organic acids, such as vinyl acetate, display properties which were in some cases inferior to the homopolymers of the alpha-substituted unsaturated nitriles.

The alpha-substituted, alpha,beta-unsaturated nitriles to be utilized in the production of the novel interpolymers of the invention are those nitriles possessing at least one unsaturated linkage between two carbon atoms of aliphatic character, one of the said carbon atoms of the unsaturated linkage being attached directly to the nitrile group and to an open-chain hydrocarbon radical or substituted open-chain hydrocarbon radical. The alpha-substituted, alpha,beta-unsaturated nitriles may be represented by the following general formula:

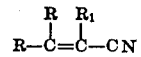

wherein $R_1$ is a member of the group comprising open-chain hydrocarbon radicals and substituted open-chain hydrocarbon radicals, and each R is a member of the group comprising the hydrogen atom, the halogen atoms, the hydrocarbon radicals or substituted hydrocarbon radicals.

The open-chain hydrocarbon radicals which $R_1$ may represent in the above-described formula may be the saturated straight and branch-chained hydrocarbon radicals, such as methyl, ethyl, propyl, isopropyl, butyl and the like; and the unsaturated straight and branch-chained hydrocarbon radicals, such as propenyl, isopropenyl, butenyl, and the like.

The substituted open-chain hydrocarbon radicals which $R_1$ may represent are the same as those open-chain hydrocarbon radicals described above wherein at least one of the hydrogen atoms has been replaced by a non-interfering substituent, such as the halogen atoms, carboxyl radicals, and the like. Examples of the substituted open-chain hydrocarbon radicals are 2-chloropropyl, 4-bromo-2-butenyl, 3-acetoxy-propyl, and the like.

The hydrocarbon radicals which R may represent in the above-described formula may be cyclic or acyclic, saturated or unsaturated.

Examples of these hydrocarbon radicals are ethyl, propyl, isopropyl, butyl, propenyl, butenyl, pentenyl, isopentyl, hexenyl, cyclopentyl, and the like. The substituted hydrocarbon radicals which R may represent are the same as the above-noted hydrocarbon radicals wherein at least one of the hydrogen atoms has been replaced by a non-interfering substituent, such as the halogen atoms, and the like.

Examples of the alpha-substituted, alpha,beta-unsaturated nitriles which may be used in the production of the novel copolymers of the invention are:

Methacrylonitrile
Alpha-ethyl acrylonitrile
Alpha-butenyl acrylonitrile
2-butyl 2-hexenenitrile
2-propenyl 2-pentenenitrile
2-chloroethyl 2-butenenitrile
2-ethyl 3-chloro 2-butenenitrile
2-isopropyl 3-bromo 2-pentenenitrile
Alpha-isopropyl beta-cyclohexyl acrylonitrile A group of the above-described alpha-substituted, alpha, beta-unsaturated nitriles which are particularly preferred in the formation of the novel copolymers of the invention are those of the above-described formula wherein $R_1$ is an alkyl radical containing from 1 to 3 carbon atoms and each R is a member of the group comprising the hydrogen atom and alkyl radicals containing from 1 to 3 carbon atoms. Examples of this particularly preferred group of the alpha-substituted, alpha,beta-unsaturated nitriles are:

Methacrylonitrile
Alpha-ethyl acrylonitrile
Alpha-isopropyl acrylonitrile
2-isopropyl 2-pentenenitrile
2-propyl 2-hexenenitrile
2-ethyl 5-methyl 2-hexenenitrile The non-alpha-substituted unsaturated nitriles to be utilized in the production of the novel interpolymers are those unsaturated nitriles possessing in an open-chain at least one unsaturated linkage between two carbon atoms, one carbon atom of the said unsaturated linkage being not more than two aliphatic carbon atoms removed from the nitrile radical, and the carbon atom joined directly to the nitrile radical (alpha carbon atom) being substituted with hydrogen atoms. A preferred group of these unsaturated nitriles are those where the unsaturated linkage is between the alpha and beta carbon atoms. This preferred group may be illustrated by the following formula:

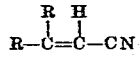

wherein each R is a member of the group comprising the hydrogen atom, the halogen atoms, hydrocarbon radicals, and substituted hydrocarbon radicals.

The hydrocarbon radicals which R may represent in the above-described formula may be cyclic or acyclic, saturated or unsaturated. Examples of these hydrocarbon radicals are ethyl, propyl, butyl, propenyl, butenyl, pentenyl, isopentyl, hexenyl, cyclopentyl, and the like. The substituted hydrocarbon radicals which R may represent are the same as the above-noted hydrocarbon radicals wherein at least one of the hydrogen atoms has been replaced by a non-interfering substituent, such as the halogen atoms, carboxyl radicals and the like. Examples of the substituted hydrocarbon radicals are: 2-chloroethyl, 3-bromobutyl, 2-acetoxybutyl, 2-bromo-3-butenyl, and the like.

Examples of the non-alpha-substituted unsaturated nitriles that may be utilized in producing the novel interpolymers are:

Acrylonitrile
2-butenenitrile
2-pentenenitrile
3-chloro 2-butenenitrile
2,4-pentadienenitrile
5-methyl 2-pentenenitrile
4-bromo 2-butenenitrile
4-cyclohexyl 2-butenenitrile A group of the above-described non-alpha-substituted unsaturated nitriles which are particularly preferred in the formation of the novel interpolymers are those of the above-described general formula wherein R is a member of the group comprising the hydrogen atom and alkyl radicals containing from 1 to 3 carbon atoms. Examples of this particularly preferred group of unsaturated nitriles are: acrylonitrile, 2-butenenitrile, 2-pentenenitrile, 3-methyl 2-butenenitrile, and the like.

The unsaturated esters of the organic acids to be interpolymerized with the alpha-substituted, alpha,beta-unsaturated nitriles and the non-alpha-substituted unsaturated nitriles may be any ester-type compound possessing at least one unsaturated linkage between two carbon atoms of aliphatic character. The unsaturated linkage may be located either in the alcohol portion of the ester, in the acid portion of the ester molecule, or in both the alcohol and acid portion of the ester molecule.

The acid portion of the ester-type compound may be derived from an organic acid which may be aliphatic, acyclic or aromatic and may be either monobasic or polybasic. Such acids include acetic acid, acrylic acid, cyclohexanoic acid, malonic acid, glutaric acid, benzoic acid, and phthalic acid and the like.

The alcohol portion of the ester-type compound may be derived from any aliphatic, acyclic or aromatic alcohol which may be either monohydric or polyhydric. Such alcohols include vinyl alcohol, allyl alcohol, methyl alcohol, butyl alcohol, pentanol, 3-butenol, 2-chlorohexenol-1, crotyl alcohol, cyclo-hexanol, glycol, glycerol, sorbitol and the like.

Various combinations of the above-described acids and alcohols may be made in order to arrive at the proper combination for the production of the desired unsaturated ester. Examples of the unsaturated esters that may be used to produce the novel interpolymers are methyl acrylate, butyl methacrylate, vinyl acetate, allyl vinyl phthalate, cyclohexyl methacrylate, vinyl benzoate, vinyl stearate, vinyl glutarate, methyl alpha-chloroacrylate, diethyl maleate, and the like.

A preferred group of the unsaturated esters are the esters of (I) the monocarboxylic acids containing from 1 to 6 carbon atoms and (II) monohydric alcohols containing from 1 to 6 carbon atoms, wherein there is at least one olefinic double bond present somewhere in the ester molecule. Examples of this preferred group of unsaturated esters are vinyl acetate, methyl acrylate, vinyl butyrate, butyl methacrylate, allyl acrylate, cyclohexyl methacrylate, and the like.

Still more preferred groups of unsaturated esters are those of the formula:

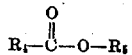

wherein $R_4$ and $R_5$ are members of the group comprising the saturated hydrocarbon radicals containing from 1 to 6 carbon atoms and the olefinic unsaturated hydrocarbons containing from 2 to 6 carbon atoms. The saturated hydrocarbon radicals are exemplified by methyl, ethyl, butyl, isobutyl, amyl, and hexyl. The unsaturated hydrocarbon radicals are exemplified by allyl, vinyl 4-butenyl, 4-hexenyl, and the like.

In the production of the novel interpolymers a single alpha-substituted, alpha,beta-unsaturated nitrile may be interpolymerized with a single non-alpha-substituted unsaturated nitrile and a single unsaturated ester, or a mixture of one or all of the components may be interpolymerized together. Thus, for example, methacrylonitrile may be interpolymerized with acrylonitrile and methyl acrylate, or methacrylonitrile may be interpolymerized with a mixture of crotonitrile and acrylonitrile and a mixture of vinyl acetate and methyl acrylate.

The components described above may be interpolymerized in the presence of already-formed plastics, including natural resins, cellulose derivatives, synthetic resins, etc. Other modifiers, including plasticizers, stabilizers, lubricants, dyes, pigments and fillers may be added during the polymerization process provided they do not chemically react with or otherwise adversely affect the ingredients of the reaction mixture, otherwise, those modifiers may be added following polymerization. Examples of modifying agents and pigments that may be added are wood flour, wood fiber, paper dust, clay, glass wool, mica, granite dust, silk flock, cotton flock, steel wool, cloth, sand titanium oxide, lead oxide, chrome yellow, gums, oils, and the like.

The mixture may be polymerized in bulk in the presence or absence of a solvent or diluent or mixtures thereof. If a solvent is used the substance may be a solvent for the reactants and polymer, or may be a solvent for the reactants and non-solvent for the polymer. Emulsifying, granulating and wetting agents may also be present. It is also possible to effect polymerization by atomizing the reactants or solution thereof in the form of a fine spray into a heated chamber containing an inert gas. It is likewise feasible to polymerize the polymerizable mixture while it is dispersed in the interstices of fibrous material such as a fabric.

The proportions of each of the three components to be used in producing the novel interpolymers should vary within certain limits in order to produce interpolymers possessing the above-described properties. Interpolymers possessing the desired properties are obtained when the quantity of the alpha-substituted, alpha,-beta-unsaturated nitriles is maintained between 80% to about 50%; the quantity of the non-alpha-substituted unsaturated nitrile is maintained between 40% to 10%; and the quantity of the unsaturated ester of the organic acids is maintained between 20% to about 5% by weight of total reactants. The maximum display of the above-described properties is obtained, however, when the amount of the alpha-substituted, alpha,beta-unsaturated nitrile is maintained between 80% to 60%; the quantity of the non-alpha-substituted unsaturated nitrile is maintained between 30% to 10%; and the quantity of the unsaturated ester is maintained between 15% and 5% by weight of the total reactants and these are the preferred proportions to be used in the interpolymerization.

The polymerization is energized by the application of heat and/or light in the presence of a polymerization catalyst. When heat is to be applied temperatures between about 30° C. and about 150° C. are usually sufficient to accomplish the desired polymerization. A preferred temperature range lies between about 40° C. to about 80° C.

The catalysts that may be utilized in the polymerization include the per-acid catalysts, such as persulfuric acid, peracetic acid, and perphthalic acid, the per-salts, such as potassium persulfate, the peroxide catalysts, such as hydrogen peroxide, benzoyl peroxide, succinyl peroxide, dilauryl peroxide, dibutyl peroxide, sodium peroxide, tert-alkyl hydroperoxides, such as tert-butyl hydroperoxide. If desired, mixtures of the polymerization catalysts may be employed.

The amount of the catalyst employed may vary over a considerable range depending upon the various conditions of reaction. In most cases the amount of catalyst will vary between about .01% to about 2% by weight of the material to be polymerized. A preferred amount of catalyst will vary between about .01% to about 1% by weight.

Atmospheric, reduced, or superatmospheric pressures may be used in the polymerization process. In those cases where the polymerization is maintained above the boiling point of the polymerizable mixture increased pressures may be maintained to prevent the loss of the components. The polymerization process may also be carried out under a blanket of an inert gas, such as nitrogen or carbon dioxide if desired or necessary.

The polymerization reaction may be carried to completion without substantial interruption or it may be stopped at any point short of completion. Incomplete polymerization may be used for the production of syrup which may be further worked and eventually substantially completely polymerized. The syrup, for instance, may be transferred to a mold of any desired configuration and again subjected to polymerization conditions, or it may be used in coating operations, or in impregnating bibulous, e. g. fibrous material which in turn may be used in the production of laminates. Unreacted polymerizable material may be separated from the polymer by any suitable method, such as filtration, extraction, distillation, and the like.

The polymerization may be accomplished in ally type of apparatus and may be conducted in a batch, semi-continuous or continuous manner as desired.

A particularly preferred method for the interpolymerization of the above-described mixture comprises an aqueous emulsion polymerization process. In this preferred method the desired polymerizable mixture is added to an aqueous emulsion comprising water, an emulsifying agent and the desired polymerization catalyst and the resulting mixture is subjected to polymerization conditions.

Emulsifying agents that may be employed in the preferred polymerization procedure include the soaps, such as sodium and potassium myristate, laurate, palmitate, oleate, stearate, rosinate and hydroabietate, alkali metal alkyl or alkylene sulfonates or sulfates such as sodium and potassium lauryl sulfate, cetyl sulfate, oleyl sulfonate, stearyl sulfonate, Turkey red oil, sulfonated mineral oil, as well as ammonium salts thereof; salts of higher amines like lauryl amine hydrochloride, and stearyl amine hydrobromide and high molecular weight materials, such as sodium polyacrylate, methylcellulose and the like.

The amount of the emulsifying agent to be employed in the polymerization mixture will vary over a considerable range depending upon the particular compound to be polymerized, the amount of water present in the mixture, and the like, and amount of other ingredients added thereto. In general, the amount will vary from .1% to about 10% by weight of the water present in the reaction medium. The preferred amount of the emulsifying agent to be employed will vary from between about .5% to about 5% by weight of water.

In the aqueous emulsion polymerization procedure it is sometimes desirable to maintain the emulsion in an acid state, e. g. in a pH of about 1 to 6. This may be accomplished by the use of the proper emulsifying agent which will function effectively in acid medium such as sodium alkyl sulfates or amine salts like lauryl amine hydrochloride and by adjusting the pH with the addition of a strong mineral acid such as hydrochloride, sulfuric or nitric acid.

While any of the above-described catalysts may be utilized in the aqueous emulsion reaction it is usually preferred to utilize a per-salt catalyst, such as sodium or potassium persulfate. The amount of the catalyst utilized will depend upon the various conditions of reaction but will, in general, vary between about .01% to about 2% by weight of total reactants.

The total amount of the polymerizable material to be added to the aqueous emulsion may vary over a considerable range depending upon the nature of the various ingredients and the amount of water present in the emulsion. In most cases it is desirable to maintain the ratio of polymerizable material to water smaller than 1 to 2. When the ratio is larger than 1 to 2 the emulsion, in some cases, becomes too thick to be handled efficiently and the results are not as satisfactory as desired. The preferred ratio of the polymerizable material to the water in the emulsion mixture varies between about 1 to 3 and 1 to 5.

Temperatures employed during the aqueous emulsion polymerization will, in most cases, vary between about 30° C. to about 100° C. with a preferred range being between about 40° C. to about 90° C. Atmospheric pressure is usually the preferred pressure to be employed.

The usual reactor for the emulsion polymerization is fitted with blades or paddles for keeping the emulsion in a state of agitation during the polymerization process. The reactor may also contain heating or cooling means such as coils for circulating steam or heated oils, or cold water for cooling.

The aqueous emulsion polymerization is particularly efficient when conducted in a continuous manner. In this preferred manner of conducting the process the polymerizable material is conducted through a series of distinct reaction zones like separate connected reaction chambers. The flow in the process is such that it continuously advances from chamber to successive chamber without appreciable, or preferably no back flow. The number of reaction zones in series is preferably at least four and may be as many as twenty or higher. Additional polymerizable material is continuously introduced at one or more of the reaction zones other than the first. A more detailed description of a continuous aqueous emulsion polymerization process is found in co-pending application to Willem L. J. De Nie, Serial No. 681,681, filed July 6, 1946, now U. S. Patent 2,537,334.

The polymers formed during the polymerization process will, in most cases, be obtained in the form of a latex, which may be readily separated from the reaction mixture by any suitable means comprising coagulation with electrolytes, solvents, freezing, and the like.

The interpolymers obtained by the interpolymerization of alpha-substituted alpha,beta-unsaturated nitriles, the non-alpha-substituted unsaturated nitriles, and the unsaturated esters will be substantially colorless solids possessing a relatively high molecular weight. Resins obtained from the novel interpolymers are characterized by their increased heat resistance, their improved hardness, and their exceptionally fine flexibility. The resins may readily be cast into sheets, rods, tubes, and the like of any desired shapes or sizes. They may also be subjected to extrusion and to injection and compression molding in the presence or absence of added diluents. They also may be utilized in the molten or solvent solution in the production of surface coatings and impregnating agents. Because of their increased heat resistance and exceptionally high degree of flexibility the resins are particularly adapted to the production of articles which may be exposed to relatively high temperature and must withstand off-side pressure, such as medical instruments, and the like.

To illustrate the manner in which the invention may be carried out the following examples are given. It is to be understood, however, that the examples are for the purpose of illustration only and they are not to be regarded as limiting the invention in any way.

The flexural strengths reported in the following examples were determined by A. S. T. M. test D-650-42-T. The heat distortion points were determined by A. S. T. M. test D-648-41-T under the conditions that the samples were heated in air at one degree per minute.

*Example I*

A series of polymers were prepared in an aqueous emulsion from the materials indicated in the table below. The total monomer (100 parts) was added to a mixture consisting of 300 parts of water, 1 part of potassium persulfate, and 1 part of sodium lauryl sulfate and the resulting mixture heated to 50° C. The polymers obtained in each case were molded under the following conditions: preform preheated for 20 minutes in an oven at 135° C. and then molded for 12 minutes at 150° C. and 4000 p. s. i. Some of the physical properties of the resulting resins are shown in the following table:

| Material Polymerized, per cent by weight | Flexural Strength, p. s. i. | Heat distortion point |
|---|---|---|
| Man : An : Va[1] | | °C. |
| 70 : 30 : 0 | 9,200 | 89 |
| 79 : 16 : 5 | 29,000 | 91 |
| 65 : 30 : 5 | 27,600 | 89 |
| 65 : 25 : 10 | [2] 28,600 | 91 |

[1] Man, methacrylonitrile. An, acrylonitrile. Va, vinyl acetate.
[2] Specimen did not break in flexure; value given for fiber stress at the ultimate load.

Example II

About 80 parts of alpha-ethyl acrylonitrile, 15 parts of acrylonitrile and 5 parts of methyl acrylate are polymerized in aqueous emulsion as shown in Example I. The resin obtained from the resulting polymer shows a high heat distortion point and improved flexibility.

Example III

About 60 parts of alpha-ethyl acrylonitrile, 30 parts of acrylonitrile and 10 parts of allyl vinyl phthalate are polymerized in aqueous emulsion as shown in Example I. The resins obtained from the resulting polymers display properties similar to those described above.

Example IV

The following unsaturated esters (5 parts) are polymerized with 70 parts of methacrylonitrile and 25 parts of acrylonitrile by an aqueous emulsion polymerization process; allyl vinyl phthalate, butyl methacrylate, vinyl butyrate, cyclohexyl methacrylate and butyl acrylate.

We claim as our invention:

1. A resin comprising an interpolymer of 65% methacrylonitrile, 25% acrylonitrile, and 10% vinyl acetate.
2. A resin comprising an interpolymer of 80% of alpha-ethyl acrylonitrile, 15% crotonitrile, and 5% methyl acrylate.
3. A resin comprising an interpoylmer of 65% of methacrylonitrile, 30% acrylonitrile, and 5% methyl acrylate.
4. A resin comprising an interpolymer of 80% to 60% methacrylonitrile, 30% to 10% acrylonitrile and 5% to 15% of vinyl acetate.
5. A resin comprising an interpolymer of 80% to 60% methacrylonitrile, 30% to 10% acrylonitrile, and 5% to 15% methyl acrylate.
6. A resin comprising an interpolymer of 80% to 60% methacrylonitrile, 30% to 10% acrylonitrile, and 5% to 15% of an unsaturated ester of (1) a monocarboxylic acid containing from 1 to 6 carbon atoms and (2) a monohydric alcohol containing from 1 to 6 carbon atoms wherein there is at least one olefinic double bond somewhere in the ester molecule.

7. An interpolymer of 80% to 60% of methacrylonitrile, 30% to 10% of an unsaturated nitrile of the formula

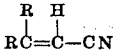

wherein R is a member of the group consisting of hydrogen and aliphatic hydrocarbon radicals, and 5% to 15% of an unsaturated ester of (1) a monocarboxylic acid containing from 1 to 6 carbon atoms, and (2) a monohydric alcohol containing from 1 to 6 carbon atoms, said ester containing at least one olefinic double bond.

8. An interpolymer of 80% to 50% of an unsaturated nitrile of the formula

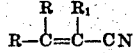

wherein $R_1$ is an open-chain aliphatic hydrocarbon radical and R is a member of the group consisting of hydrogen and aliphatic hydrocarbon radicals, 40% to 10% of an unsaturated nitrile of the formula

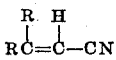

wherein R is a member of the group consisting of hydrogen and aliphatic hydrocarbon radicals, and 20% to 5% of an unsaturated ester of an organic acid, said ester containing at least one olefinic double bond.

9. An interpolymer of 80% to 50% of an alpha-substituted unsaturated nitrile of the formula

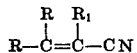

wherein $R_1$ is an open-chain aliphatic hydrocarbon radical and R is a member of the group consisting of hydrogen and aliphatic hydrocarbon radicals, 40% to 10% of a non-alpha-substituted unsaturated nitrile of the formula

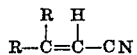

wherein R is a member of the group consisting of hydrogen and aliphatic hydrocarbon radicals, and 20% to 5% of an unsaturated ester of (1) a monocarboxylic acid containing from 1 to 6 carbon atoms, and (2) a monohydric alcohol containing from 1 to 6 carbon atoms, said ester containing at least one olefinic double bond.

10. An interpolymer as defined in claim 9 wherein the non-alpha-substituted unsaturated nitrile is acrylonitrile.

11. An interpolymer as defined in claim 9 wherein the unsaturated ester is vinyl acetate.

MARGUERITE NAPS.
FRED E. CONDO.

REFERENCES CITED

The following references are of record in the file of this patent:

UNITED STATES PATENTS

| Number | Name | Date |
|---|---|---|
| 2,232,899 | D'Alelio | Oct. 26, 1943 |
| 2,486,241 | Arnold | Oct. 25, 1949 |